United States Patent [19]
Toor

[11] Patent Number: 5,748,442
[45] Date of Patent: May 5, 1998

[54] PERSONAL COMPUTER AND CHASSIS HAVING INTERCHANGEABLE TRIM PLATES FOR HORIZONTAL MODEL AND TOWER MODEL CONFIGURATION, ONE TRIM PLATE HAVING A LARGER PERIPHERY FOR USE AS A BASE PLATE

[75] Inventor: John Toor, Palo Alto, Calif.

[73] Assignee: Palo Alto Design Group, Palo Alto, Calif.

[21] Appl. No.: 555,518

[22] Filed: Nov. 8, 1995

[51] Int. Cl.$^6$ .............................. G06F 1/16; H05K 5/02
[52] U.S. Cl. ............................................. 361/685; 361/683
[58] Field of Search ................... 364/708.1; 312/223.2; 361/683, 685, 724–727

[56] References Cited

U.S. PATENT DOCUMENTS

| | | |
|---|---|---|
| 3,679,829 | 7/1972 | Hofmeister et al. |
| 4,132,295 | 1/1979 | Hochfelsen |
| 4,669,053 | 5/1987 | Krenz |
| 5,021,922 | 6/1991 | Davis et al. |
| 5,136,466 | 8/1992 | Remise et al. |
| 5,136,468 | 8/1992 | Wong et al. |
| 5,172,305 | 12/1992 | DeWilde |
| 5,212,628 | 5/1993 | Bradbury |
| 5,235,493 | 8/1993 | Yu .................................. 361/685 |
| 5,247,428 | 9/1993 | Yu |
| 5,513,068 | 4/1996 | Girard ............................ 361/685 |
| 5,600,538 | 2/1997 | Xanthopoulos ................ 361/683 |

FOREIGN PATENT DOCUMENTS 0 421 847 A1  9/1990  European Pat. Off.

OTHER PUBLICATIONS

IBM Technical Disclosure Bulletin, vol. 33, No. 12, pp. 354–356, May 1991, "Floor Stand Adapter For Personal System Unit", May 1991.

Primary Examiner—Michael W. Phillips
Attorney, Agent, or Firm—Haverstock & Associates

[57] ABSTRACT

A personal computer chassis having increased reliability, versatility and decreased manufacturing costs. In a first embodiment, a disk drive is installed in the chassis in a first orientation for resting the computer on a desk top or in a second orientation, rotated 90 degrees from the first orientation, for resting the computer on a floor. The chassis is configured to allow interchangeable trim plates. When the trim plate is used as a base plate it has a larger periphery than when used as a side trim plate. In a second embodiment, a disk drive may be installed in the chassis without screws. Spring urged clips allow the disk drive to be easily inserted into the computer chassis, yet provide secure attachment. In a third embodiment, electrical contact is ensured for input/output port covers attached to the rear of the computer chassis. Each cover is made to bend slightly over protrusions on the computer chassis, forcing the cover into firm contact with the protrusions. In a fourth embodiment, a cooling fan housing is attached to the computer chassis without screws. Protrusions on the fan housing engage apertures in the computer chassis such that the fan housing easily snaps into place and is securely held. In a fifth embodiment, standoffs are inserted into the computer chassis through rectangular holes. Each rectangular hole has bumps in its interior which secure the standoff against rotating when tightening or loosening a screw. In a sixth embodiment, a security loop allows for attachment of a locking device to secure the computer against theft. In a first position, the security loop is extended. In a second position, the security loop is rotated flat against the computer chassis.

9 Claims, 13 Drawing Sheets

PERSONAL COMPUTER AND CHASSIS HAVING INTERCHANGEABLE TRIM PLATES FOR HORIZONTAL MODEL AND TOWER MODEL CONFIGURATION, ONE TRIM PLATE HAVING A LARGER PERIPHERY FOR USE AS A BASE PLATE

FIELD OF THE INVENTION

This invention relates to the field of personal computers. More particularly, the present invention relates to the field of personal computers having features which increase structural soundness and ease of manufacture.

BACKGROUND OF THE INVENTION

Personal computers sell in a competitive market such that even modest differences in price, features, reliability, versatility, and the like can greatly affect sales volumes. In addition, personal computers are often manufactured on a large scale wherein small reductions in per-unit cost can aggregate to a significant amount of savings or increased profit. Further, an important element comprising a personal computer is the computer chassis and computer case.

In the competitive market for personal computers it is desirable to offer a variety of model types each having a different selection of features and/or configurations. This allows purchasers to select among the various model types to purchase a personal computer that most matches their requirements for functionality and price. Unfortunately, each model type typically requires the manufacturer and/or seller of such equipment to maintain an inventory of equipment and parts to support each such model type. In addition, the manufacturer must also develop manufacturing specifications, lines and routines to support and build each of these model types.

One well known distinction between model types is whether the personal computer is designed to sit horizontally or upright. The upright model is conventionally known as a tower computer. Personal computers are generally configured to include feet. Feet are provided for a variety of well known reasons. For example, soft rubber feet prevent the personal computer from easily sliding along a desk or floor surface. This will prevent the personal computer from damaging such a surface by scratching it or being injured by falling from a desk top to the floor. Additionally, feet provide mechanical isolation for the personal computer to prevent mechanical shocks or buzzing from being transferred between the personal computer and the surface on which it rests. Because a personal computer is configured to either be a horizontal desk top model or tower model, feet are provided on only one bottom surface of the exterior personal computer case. Additional feet on a second surface are not desired because such feet are not generally considered aesthetically attractive and raise the cost of the computer.

It is well recognized that many personal computers include spinning media for storing large numbers of data bits. Such media include hard disks, optical disks, and floppy disks of two conventional sizes. To ensure proper operation of an optical disk, such as a CD-ROM, it is necessary that the spinning disk be horizontally oriented. This provides for proper alignment of the optical disk to the read/write apparatus and avoids prevents the spinning media from falling off the spinning carriage. In addition, users of personal computers may expect that a given media type be mounted in a particular orientation. Thus, even for a horizontal desk top model and tower model personal computer that have the identical functional characteristics, the spinning media sub-systems must be mounted differently in each case. For conventional personal computer devices this will require the manufacturer of two such systems to maintain two inventories of separate chassis, one for the horizontal desk top model and a second for the tower model. In the alternative, a single chassis can be modified in one case with mounting hardware for a horizontal desk top model and in a second case with mounting hardware for a tower model. Once so modified, the manufacturer must separately track such chassis to ensure that the proper chassis are used for building a horizontal desk top or tower model personal computer. The requirement of storing separate inventory and/or separate tracking of chassis will necessarily increase the manufacturing cost of such systems.

Accordingly, a readily convertible chassis system for a personal computer that can be easily modified for use as a desk top and tower is needed. It is desirable that such a convertible chassis system would allow the rotating media to be selectively installed for either a horizontal desk top model or a tower model. Further, this desired convertible chassis system would include a selectable exterior to allow feet to be aesthetically and selectively placed onto a predetermined bottom surface.

Conventionally, rotating media sub-systems and other sub-systems are mounted to the personal computer chassis using screws. It is well known that using screws adds time and expense to a manufacturing process. In addition, screws can be not installed fully or even forgotten, resulting in a lower quality assembly. The rotating media sub-system must be properly aligned with the screw holes, any lock washers must be applied to the screws, the screws are typically applied and loosely threaded into the accepting screw holes, and finally, once all the screws are in place, the several screws are tightened. This repetitive and recursive process is difficult to automate and thus requires significant human labor. A chassis for a personal computer is needed that allows a rotating media sub-system or other sub-system to be mounted without the use of screws.

Commercially available personal computer systems include a so-called mother board which contains the central processing unit, general control circuits and also has several card slots. Each of the card slots is configured to accept an input/output card, each having an input/output port. The chassis for such conventional personal computer systems includes a plurality of removable input/output port covers attached to the rear of the computer case and the computer chassis itself. Typically, one port cover corresponds to each card slot on the mother board. Secure connection of these covers to the chassis, including an electrical connection between the cover and the chassis, is important for maintaining an electromagnetic shield around the computer circuits. Such secure grounding is a radio interference requirement governed by governmental regulations. Unfortunately, securing the port covers to the personal computer chassis can consume significant labor time. Further, if the user removes the cover to install an input/output card and later removes the card, the user may not take the steps necessary to ensure that the cover is sufficiently grounded to the chassis. An easily installed input/output port cover is needed that automatically forms a secure electrical connection to the chassis ground.

In conventional personal computer systems, the chassis or interior surface of the case is metallic to provide the governmentally required electromagnetic shielding. To prevent electrical contact between this shielding and exposed electrically active circuitry on the mother board such as printed traces, solder bonds, jumper wires and the like, the mother board is typically mounted to the chassis using standoffs. A conventional standoff is a piece of sheet metal folded into a u-shape which is inserted into a rectangular hole cut into a base of the chassis. A threaded hole is formed in the base of the u-shape and a screw is passed through the mother board and secured to the standoff through this threaded hole. Unfortunately, as the screw is tightened, or if there is sufficient friction between the screw and the threaded hole, the standoff can resiliently collapse within the rectangular hole and spin. If the standoff spins as a result of friction between the screw and the threaded hole, the mother board may not be securely mounted to the standoff which can result is a later failure of the personal computer system. If the standoff is snug against the mother board, the mother board can be damaged by the spinning standoff. The standoff can be damaged while it collapses so that it cannot firmly hold the mother board to the chassis. Finally, the standoff can escape the rectangular hole while in the resiliently collapsed hole so that the mother board is not attached to the chassis as desired. What is needed is a standoff for holding the mother board in a predetermined relation to the chassis that cannot spin relative to the chassis.

Almost all commercially available personal computer systems include a cooling fan for maintaining the electronic circuits in the system at an acceptable temperature. All such fans are mounted to the personal computer chassis using screws. Typically, four screws are used for each fan. Thus, installation of such a fan is a time consuming manufacturing process. Further, should one or more of the screws be improperly or insecurely installed, the screw can become loosened and cause an annoying vibration. If a screw becomes completely loose, it can fall within the personal computer and destroy the system by shorting electrical contacts or jamming a mechanical system.

Many purchasers of personal computers desire a mechanical system for physically protecting the system from theft. Such theft prevention systems typically include hardware for locking the personal computer to a relatively immovable object such as a desk or wall. Such hardware can be a loop or handle to which a cable or chain is mounted. Unfortunately, to offer such a theft prevention system requires the manufacturer to separately track those systems that do and do not have this ancillary equipment. Further, if not needed the theft prevention system can interfere with the enjoyable use of the personal computer by physically interfering with placement of the personal computer onto a desired location. What is needed is a selectably usable theft prevention system that only selectively extends from the case of the personal computer.

In view of the above, it is desirable to increase reliability and versatility and to decrease costs associated with the manufacture of personal computer chassis. Therefore, an object of this invention is to increase reliability, versatility and/or decrease costs associated with the manufacture of personal computers and their chassis.

SUMMARY OF THE INVENTION

The invention is a chassis for a personal computer having features which increase reliability, versatility and/or decrease costs associated with its manufacture.

In a first embodiment of the invention, a unit comprising a floppy and/or hard disk drive may be installed in the chassis in a first position for resting the computer chassis horizontally, such as on a desk top or in a second position, rotated 90 degrees from the first position, for resting the computer vertically, such as on a floor. This embodiment may also include a changeable plate attached to one surface of the computer. The plate is a base plate and has a larger periphery when the computer is for use vertically and the plate is a side trim plate when the computer is for use horizontally.

In a second embodiment of the invention, a floppy drive, hard disk drive, or optical drive may be installed in the chassis without the use of screws. In this embodiment, spring urged clips allow the removable media and/or hard disk drive to be easily inserted into the computer chassis, yet provide a secure attachment for the drive.

In a third embodiment of the invention, means are provided for ensuring a reliable electrical connection between changeable input/output port covers attached to the rear of the computer case and the computer chassis itself. Secure connection of these covers is important for maintaining an electromagnetic shield around the computer circuits. The covers may be configured with openings for providing an ability to electrically connect external devices to the computer circuits. In this embodiment, a metallic portion of the computer chassis has small metallic protrusions. A cover has a first end which fits into a slot in the computer chassis. A second end of the cover is secured to the computer chassis by a screw such that the cover is made to bend slightly over the protrusions, forcing the cover into firm contact with the computer chassis in the area of the slot, the protrusions and the screw.

In a fourth embodiment of the invention, a housing for a cooling fan is attached to an inner surface the computer chassis without the need for screws. In this embodiment, the fan housing has a first grating for allowing warm air drawn from the computer case to enter the fan housing. Opposite the first grating of the fan housing is an opening in one side of the fan housing which mates with a corresponding opening in the computer case. The opening in the computer case is covered with a second grating for allowing warm air to escape the computer chassis and fan housing. Four protrusions on the fan housing engage four apertures in the computer chassis such that each protrusion may be inserted into an aperture and then moved a short distance perpendicular to the direction of insertion. Once the fan housing is moved the short distance, it may not be disengaged from the computer chassis without moving it backwards along the short distance. Two additional protrusions on the fan housing engage two corresponding additional apertures in the computer chassis such that the two additional protrusions are aligned to and snap into their corresponding apertures only after the fan housing has been moved the short distance.

In a fifth embodiment of the invention, standoffs are provided for mounting a printed circuit board to the computer chassis without allowing metallic elements of the printed circuit board to contact the computer chassis or the computer case. The standoffs are formed of sheet metal which is folded for strength. The standoffs are inserted into the computer chassis through a rectangular hole. The rectangular hole has one or more bumps in its interior which secure the standoff against rotating in the hole under the force of tightening or loosening a screw which attaches the printed circuit board to the standoff.

In a sixth embodiment of the invention, a security loop is rotatably attached to the computer chassis. The security loop allows for the attachment of a security cable and/or locking device to secure the computer chassis to an immovable object for theft prevention. In a first position, the security loop is extended for access and attachment of the cable and/or locking device. In a second position, the security loop is rotated flat against the computer chassis for circumstances wherein the security loop is not being used.

DETAILED DESCRIPTION OF THE PREFERRED EMBODIMENT

Figure 1:
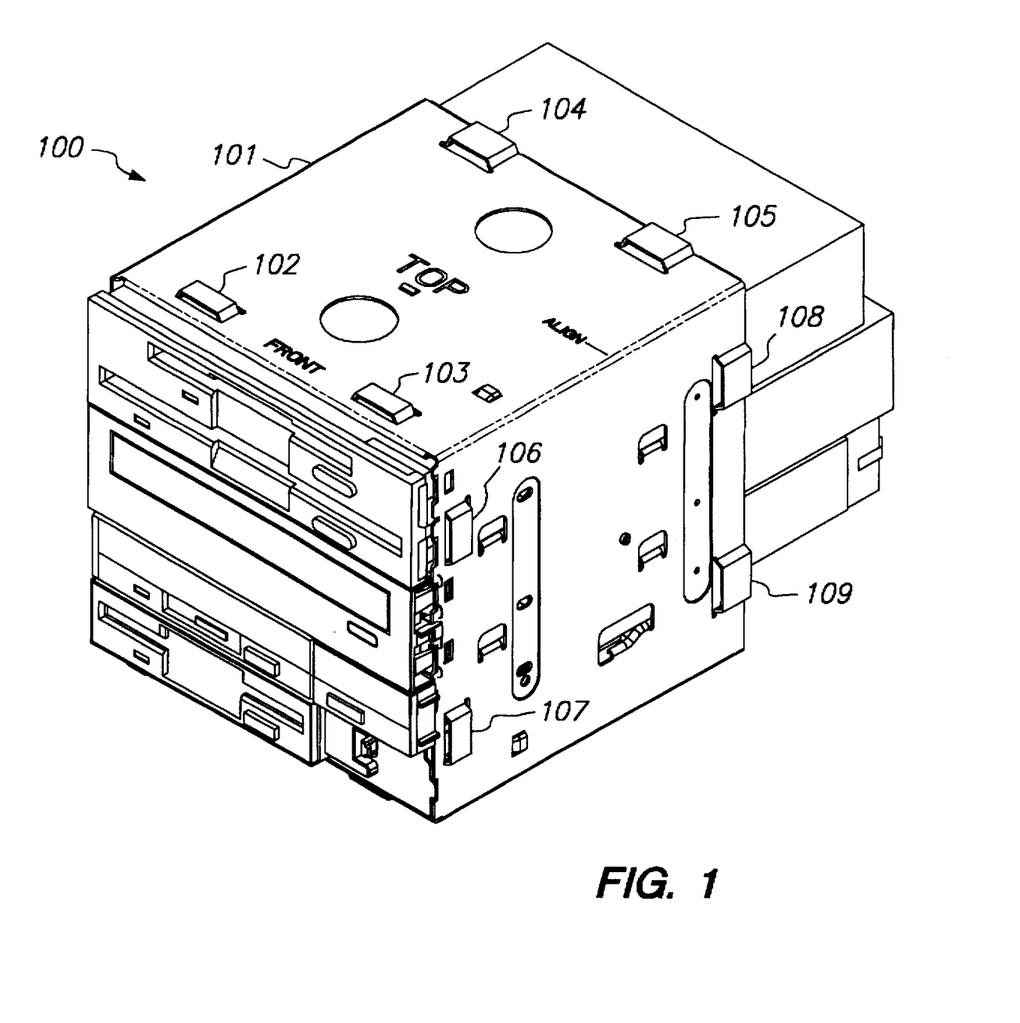
FIG. 1 shows the removable media and/or hard disk drive housing which can be installed in the computer chassis in one of two orientations.

FIG. 1 shows a removable media and/or hard disk drive unit 100 which can be installed in a computer chassis 1 (FIG. 2) in one of two positions or orientations. The drive unit 100 may comprise any number of hard disk drives, floppy disk drives, optical drives and/or other digital memory which are secured within a drive housing 101. The drive housing 101 has two top front mounts 102, 103, two top back mounts 104, 105, two side front mounts 106, 107, and two side back mounts 108, 109. The mounts 102–109 each comprise a raised loop which preferably has a trapezoidal cross section, as can be seen in FIG. 1, but could have some other cross section. The mounts 102–109 are preferably formed in a punch press. The mounts 106–109 comprise a first group of mounts and the mounts 102–105 comprise a second group of mounts.

Figure 2:
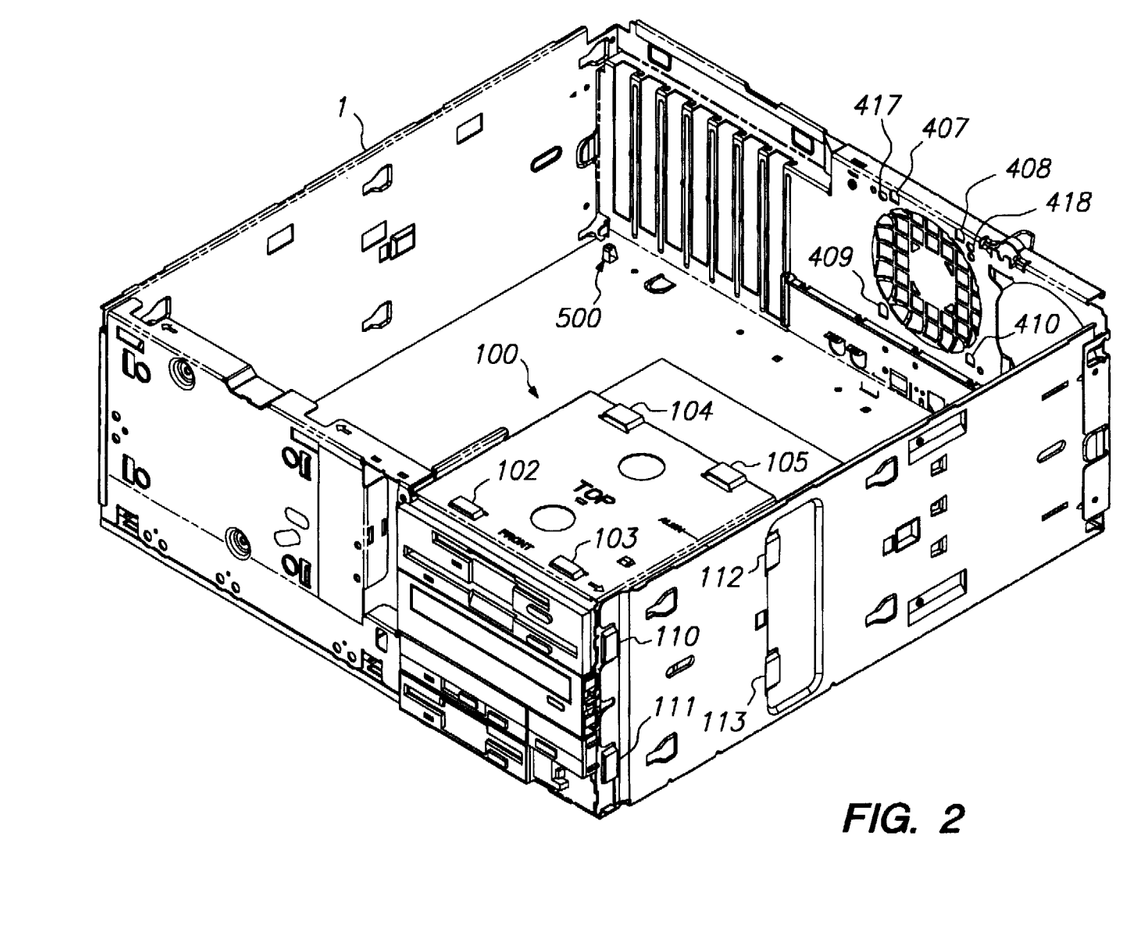
FIG. 2 shows the removable media and/or hard disk drive housing which is installed in the computer chassis in the first orientation.

FIG. 2 shows the drive unit 100 which is installed in the computer chassis 1 in the first orientation. The drive unit 100 is insertable and removable from the front of the computer chassis 1 (the top trim plate of the computer case may not need to be removed). Two front clips 110, 111 engage the two side front mounts 106, 107, for securing the drive unit 100 to the computer chassis 1. Two back clips 112, 113, engage the two side back mounts 108, 109, also for securing the drive unit 100 to the computer chassis 1.

Figure 3:
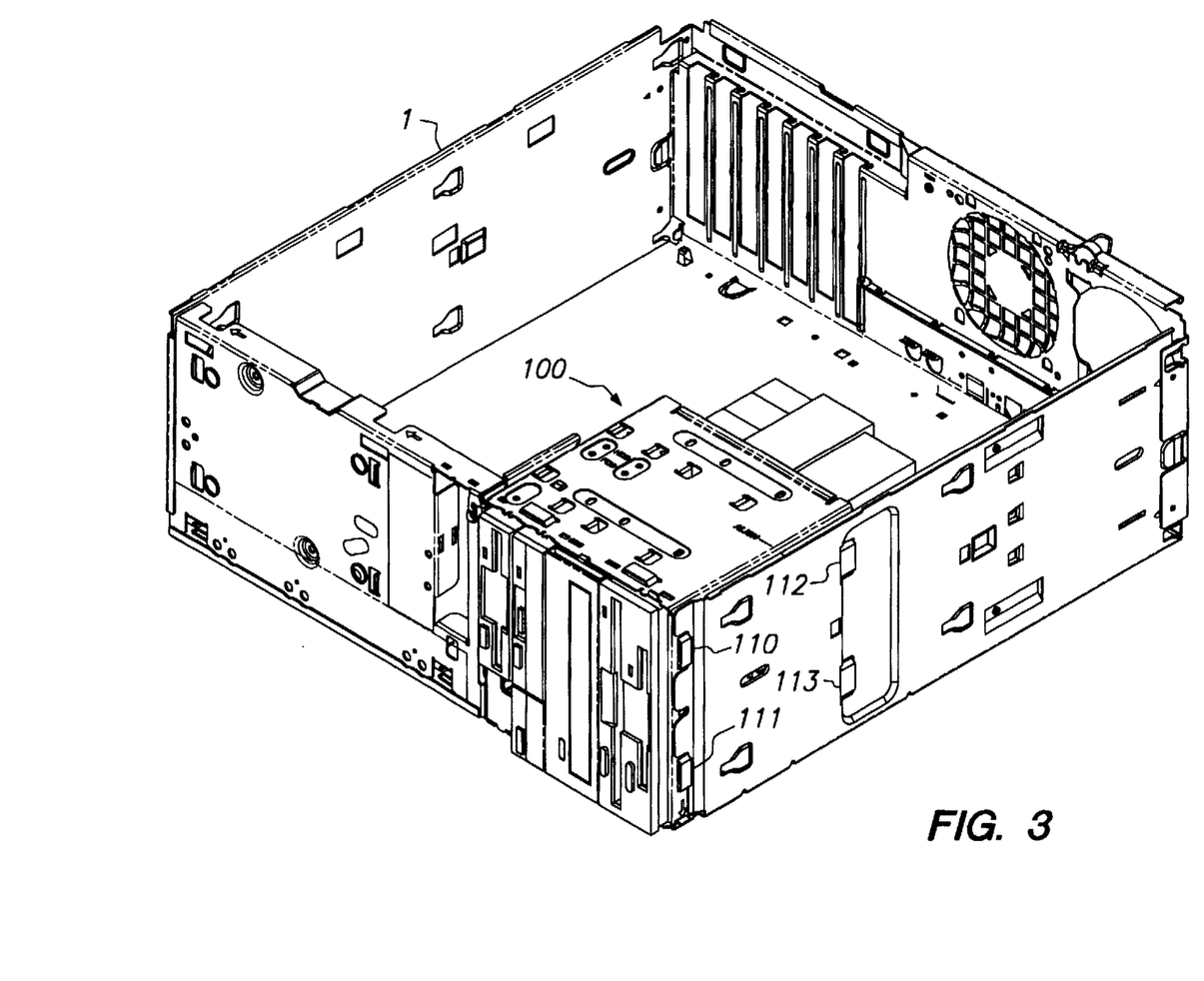
FIG. 3 shows the removable media and/or hard disk drive housing which is installed in the computer chassis in the second orientation.

FIG. 3 shows the drive unit 100 which is installed in the computer chassis 1 in the second orientation. Two front clips 110, 111 engage the two top front mounts 102, 103, for securing the drive unit 100 to the computer chassis 1. Two back clips 112, 113, engage the two top back mounts 104, 105, also for securing the drive unit 100 to the computer chassis 1.

The drive unit 100 may be coupled to a computer chassis 1 in a first orientation using the first group of mounts 106–109 or may be coupled to the computer chassis 1 in a second orientation using the second group of mounts 102–105. A third group of mounts (not shown) are formed in a surface opposite the second group of mounts 102–105. This third group of mounts is coupled to clips (not shown) in a base of the computer chassis 1 along with the first group of mounts 106–109 when the drive unit 100 is mounted in the computer chassis 1 as shown in FIG. 2. Similarly, when the drive unit 100 is mounted as shown in FIG. 3, the first group of mounts 106–109 are coupled to the clips (not shown) in the base of the computer chassis 1.

Figure 4:
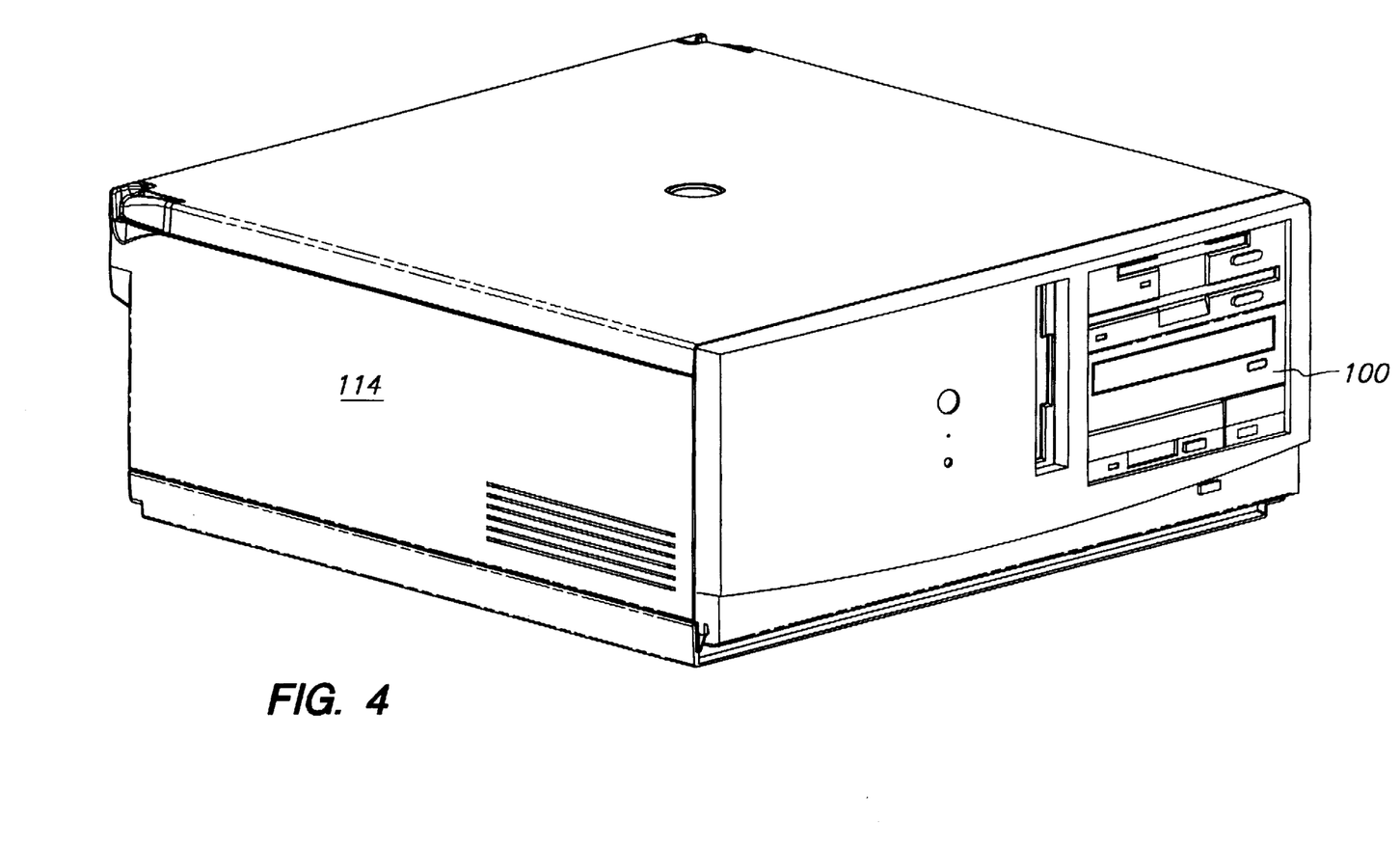
FIG. 4 shows the removable media and/or hard disk drive housing which is installed in the computer chassis in the first orientation along with the side trim plate.

FIG. 4 shows the drive unit 100 which is installed in the computer chassis 1 in the first orientation along with a side trim plate 114. The arrangement shown in FIG. 4 is for placing the computer horizontally on a table or desk top. In the arrangement shown in FIG. 4, feet are preferably installed onto the bottom of the personal computer case.

Figure 5:
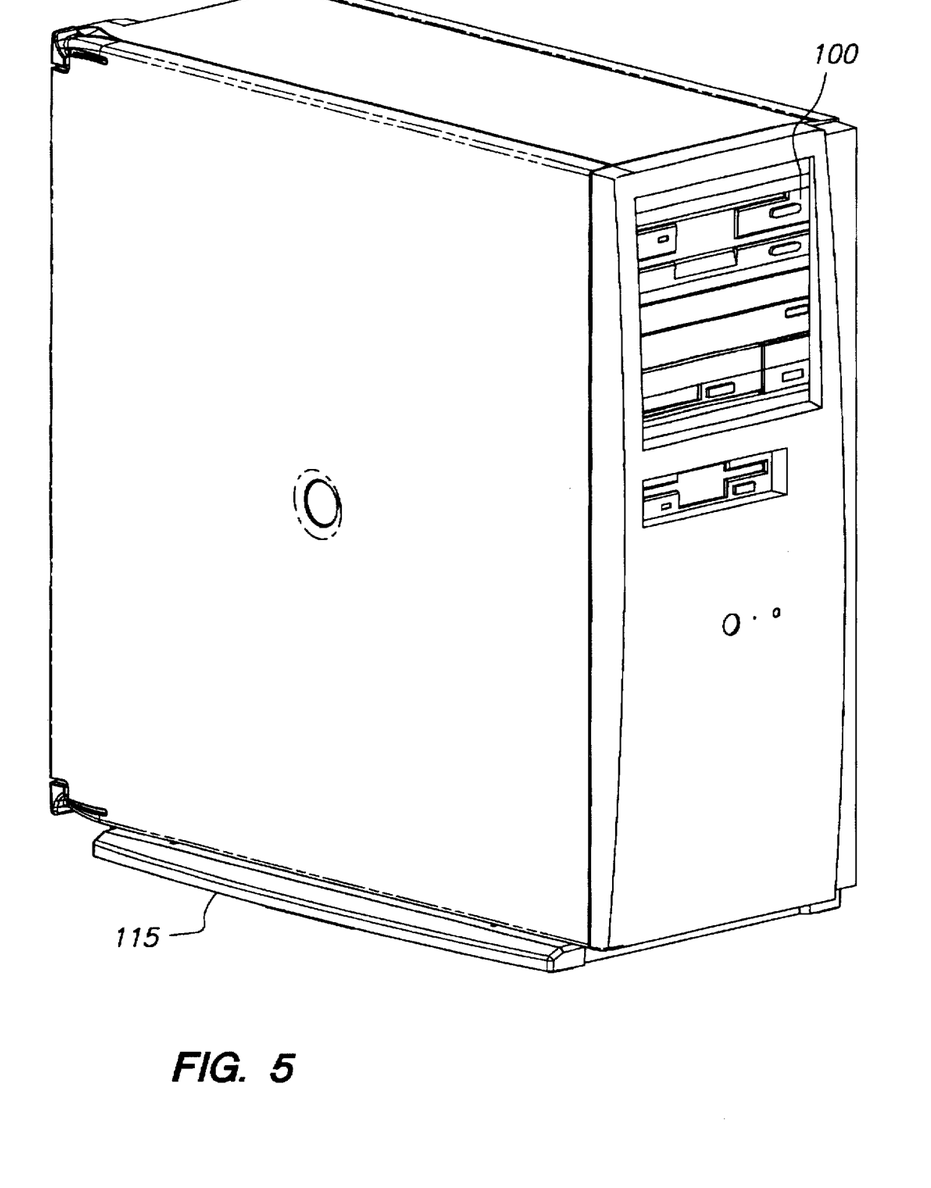
FIG. 5 shows the removable media and/or hard disk drive housing which is installed in the computer chassis in the second orientation along with the base plate.

The side trim plate may be removed and replaced as shown in FIG. 5. Preferably, the trim plates are configured to snap into and out of position. The personal computer of the present invention is designed to be selectably configured as a horizontal desk top model or a tower model by the manufacturer, so the user will not have access to substitute trim plates. However, this configuration allows the manufacturer to avoid having to stock and track the manufacture of storage media into the computer chassis. Alternatively, conversion kits may be made available for allowing a user to reconfigure a personal computer from a horizontal model to a tower model or to reconfigure a tower model to a horizontal model.

FIG. 5 shows the drive unit 100 which is installed in the computer chassis 1 in the second orientation along with a base plate 115. The arrangement shown in FIG. 5 is for placing the computer upright on a floor, such as under a desk or table, or upright on top of a desk or table. When used in this configuration, the trim plate has a larger periphery than the chassis. Mini-towers may be placed upright on a table or desk top next to, rather than under, a large display monitor so as to avoid having the monitor oriented too high relative to the user for optimum ergonomics. The base plate 115 replaces the side trim plate 114 shown in FIG. 4. The base plate 115 is configured to act as a foot to the personal computer when constructed as a tower model.

Figure 6:
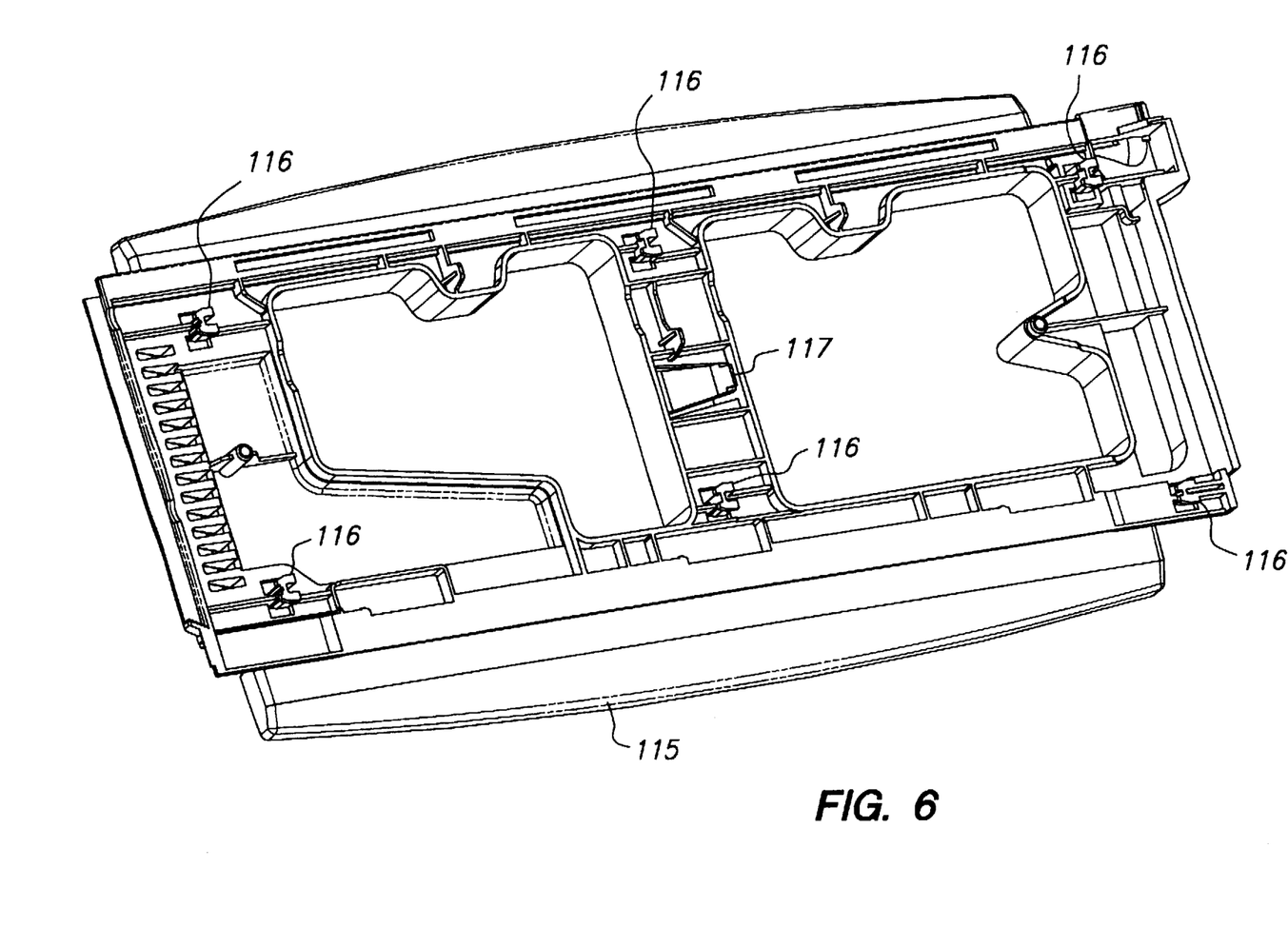
FIG. 6 shows the base plate for use when the removable media and/or hard disk drive housing is installed in the computer chassis in the second orientation.

FIG. 6 shows the base plate 115 disconnected from the computer chassis 1. The top structure of the base plate 115 is shown. The latch members 116 are configured to engage a corresponding element on the personal computer chassis. Latch member 117 also engages a corresponding element on the personal computer chassis retaining the base plate 115 and preventing the base plate 115 from sliding back relative to the chassis.

Figure 7:
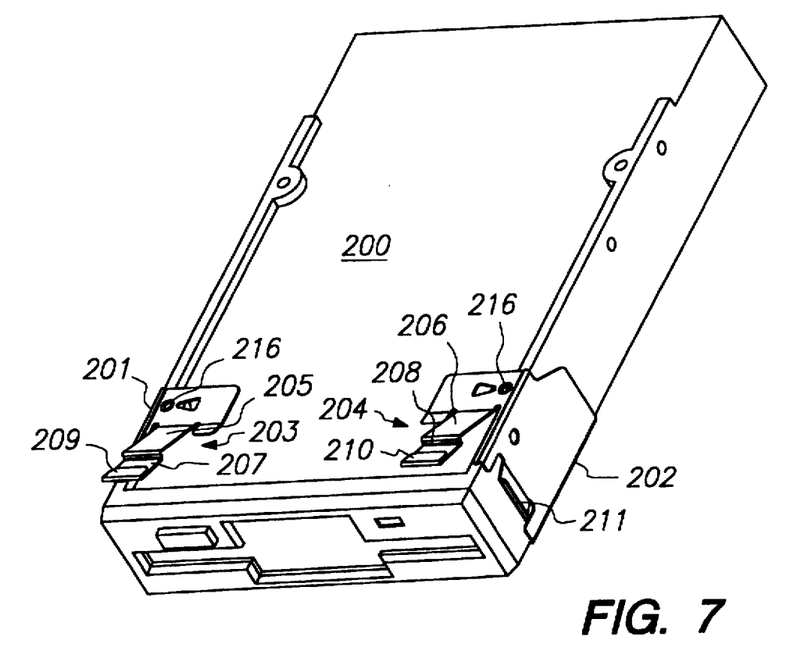
FIG. 7 shows a top view of a removable media and/or hard disk drive with mounting brackets having spring urged clips.

FIG. 7 shows a top view of a removable media and/or hard disk drive unit 200 with a left side mounting bracket 201 having a spring urged clip 203 and a right side mounting bracket 202 having a spring urged clip 204. The drive unit 200 may comprise any number of hard disk drives, floppy disk drives, optical drives and/or other digital memory. This arrangement is for insertion into a rectangular aperture 215 (FIG. 9) in the computer chassis 1 (FIG. 9) which is slightly larger than the outer dimensions of the drive unit 200 in the area of the mounting brackets 201, 202. The spring urged clips 203, 204, each have a ramped portion 205, 206, which first contacts the inner edge of the rectangular aperture 215 of the computer chassis 1 upon insertion. During an insertion operation, the computer chassis 1 forces the spring urged clips 203, 204 to bend down by pressing on the ramped portions 205, 206. At an end of the ramped portion of each spring urged clip 203, 204, is a step 207, 208. The steps 207, 208, allow the spring urged clips 203, 204, to spring back into a resting position as shown in FIG. 7 once the drive unit 200 has been inserted into the computer chassis 1 far enough that the inner edge of the aperture 215 in the computer chassis 1 has passed the ramped portions 205, 206, and reached the steps 207, 208, of each spring urged clip 203, 204. A stop 211 prevents the drive unit 200 from being inserted too far into the computer chassis 1. Once the drive unit 200 is in position, the steps 207, 208 and stop 211 hold the drive unit 200 in position. To remove the drive unit 200 from the computer chassis 1, tabs 209, 210, are simultaneously pressed down by the person removing the drive unit 200 which releases the steps 207, 208, from holding the floppy or hard disk drive in the computer chassis 1. The drive unit 200 may then be removed by pulling the drive unit 200 out of the computer chassis 1 while holding down the tabs 209, 210. Protrusions 216 allow the mounting brackets 201, 202 to snap onto the drive unit 200 in a position where there is a standard screw mounting hole in the drive unit 200. Once the drive unit 200 is installed, the protrusions 216 engage the screw mounting holes on the drive unit 200 to prevent the drive unit 200 from moving relative to the mounting brackets 201, 202.

Figure 8:
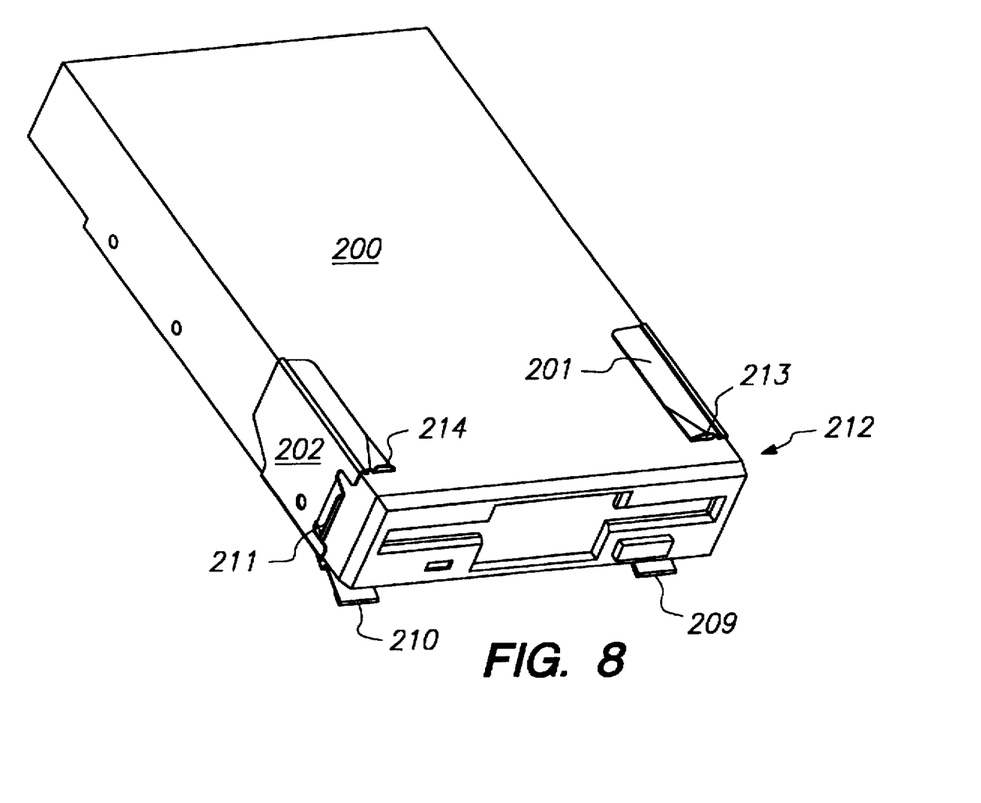
FIG. 8 shows a bottom view of a removable media and/or hard disk drive with mounting brackets having spring urged clips.

FIG. 8 shows a bottom view of the drive unit 200 and the mounting brackets 201, 202. Additional stops 213, 214, for holding the drive unit 200 in position and for preventing the drive unit 200 from being inserted too far into the computer chassis 1 are shown along with the stop 211. A stop 212 which is part of the left side mounting bracket 201 is not shown, but corresponds to the stop 211 which is part of the right side mounting bracket 202. The tabs 209, 210, can also be seen in FIG. 7.

Figure 9:
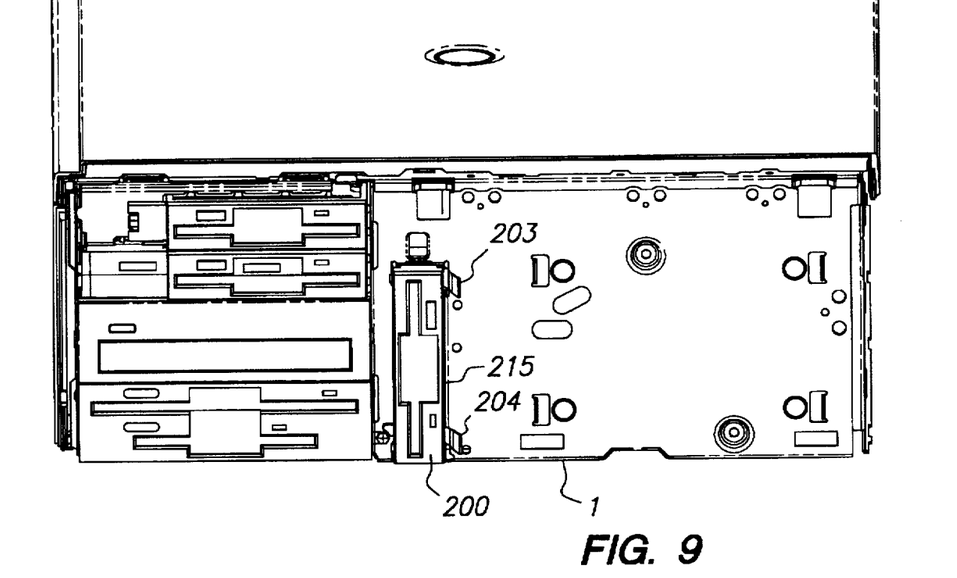
FIG. 9 shows a removable media and/or hard disk drive mounted to the computer chassis using the mounting brackets having spring urged clips.

FIG. 9 shows the drive unit 200 mounted to the computer chassis 1 using the mounting brackets 201, 202.

Figure 10:
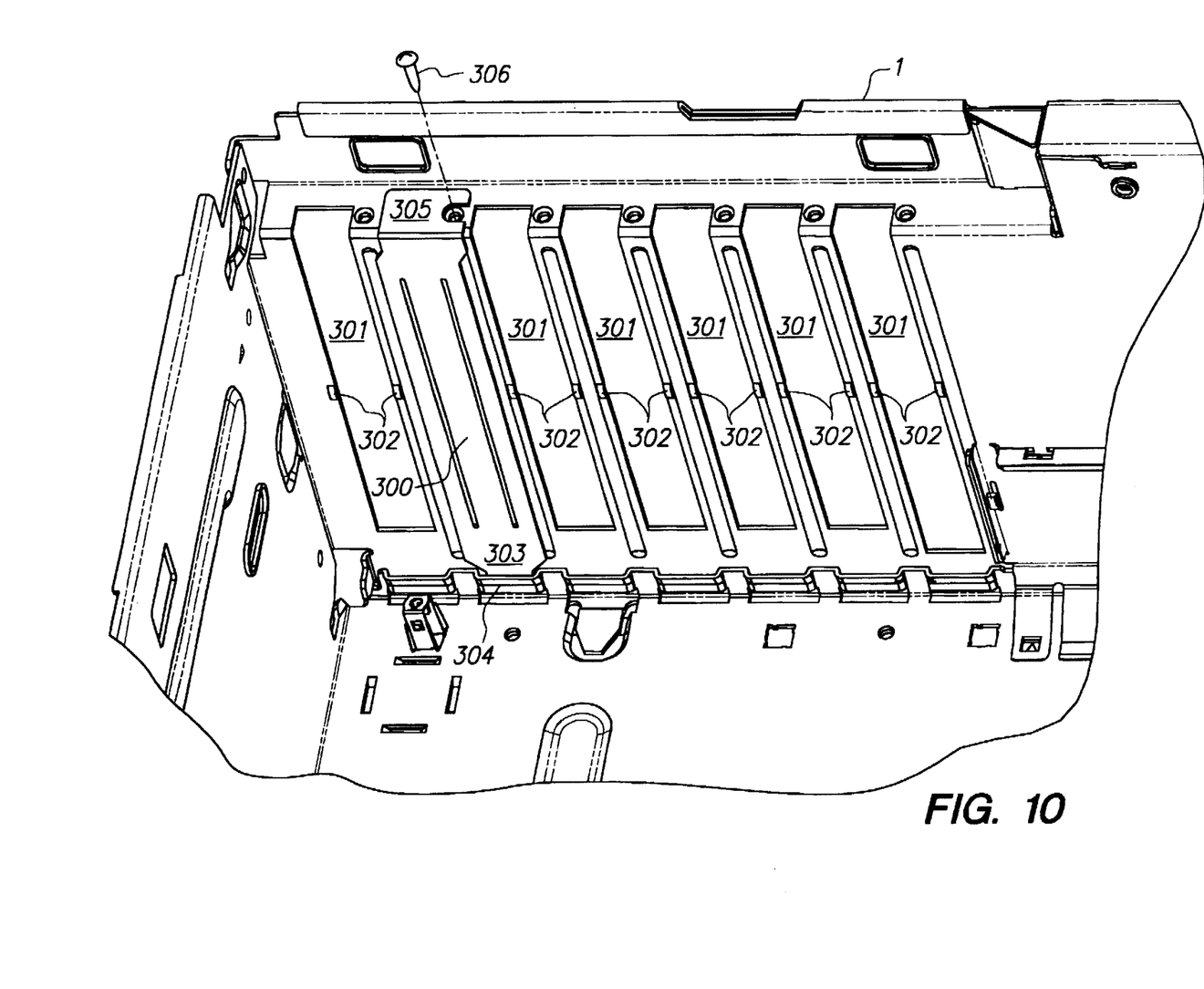
FIG. 10 shows a cover in place over an input/output opening in the rear of the computer chassis for connecting external devices to the computer.

FIG. 10 shows a portion of a computer chassis having seven input/output openings 301. One cover 300 is shown in place over one of the input/output openings 301 in the rear of the computer chassis 1 for connecting external devices to the computer. Each input/output opening 301 preferably has a corresponding cover 300 each of which may or may not have connector openings and an attached input/output circuit board. The covers 300 are used to create a electromagnetic shield around the computer circuits while selectively providing a via through which an electrical connection to external devices from the computer circuits can be made. For example, a D-type connector may be mounted in an opening the cover 300 for connecting a display monitor to the circuits housed inside the computer chassis 1. In order to form an effective electromagnetic shield, each opening 301 must be covered by a cover 300 which makes reliable electrical contact with the computer chassis 1. In this embodiment, metallic portions of the computer chassis 1 separating each opening 301, each have two integrally formed metallic protrusions 302. The protrusions 302 can be formed during the same punching operation that forms the input/output openings 301. A cover 300 has a first end 303 which fits into a slot 304 in the computer chassis. A second end 305 of the cover 300 is secured to the computer chassis 1 by a screw 306 such that the cover 300 is made to bend slightly over the protrusions 302 forcing the cover 300 into a resilient, spring urged, firm contact with the protrusions 302 of the computer chassis 1. Because of this firm physical contact between the cover 300 and the computer chassis 1 at the protrusions 302, the screw 306 and the slot 304, the cover 300 and the computer chassis 1 are at the same electrical potential (e.g., electrical ground). In addition, by reducing the distance between contacts (e.g., from the first end 303 to the protrusions 302 and from the protrusions 302 to the second end 305 rather than the longer distance from the first end 303 to the second end 305), the amplitude of an electromagnetic wave that can escape from the case is correspondingly reduced (by approximately one-half where the contacts 302 are approximately half way between the ends 305 and 303). Therefore, the electromagnetic performance is affected by both the electrical quality of the contacts and the positioning of the contacts.

Figure 11:
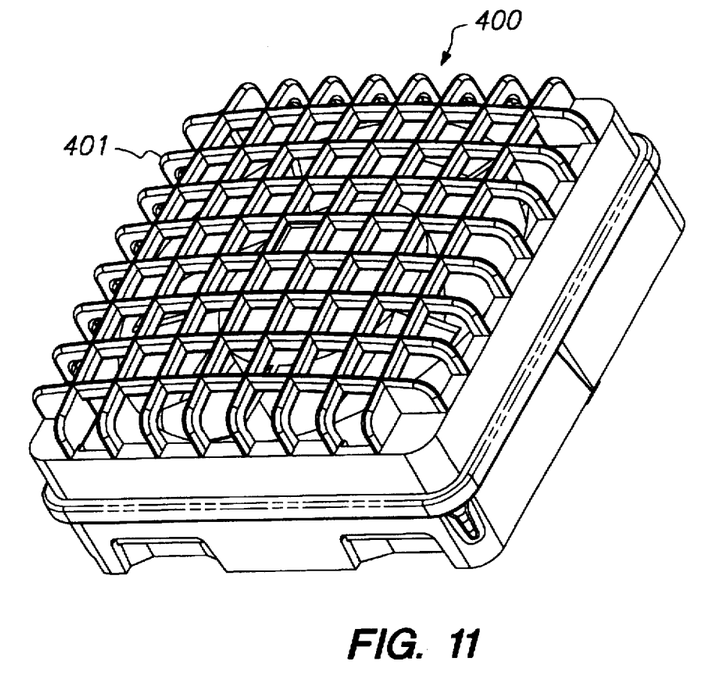
FIG. 11 shows a top view of a fan housing for a cooling fan.
Figure 12:
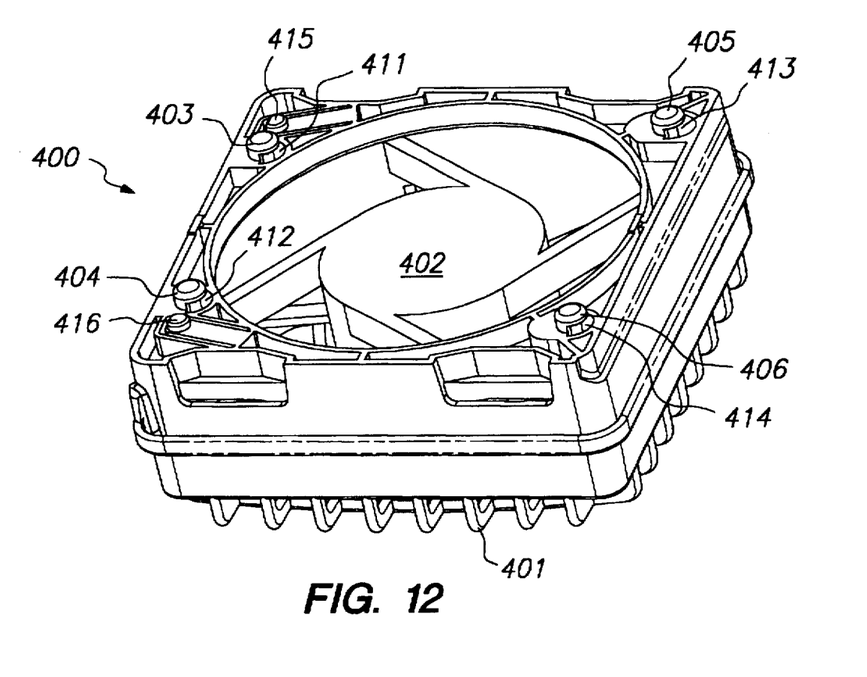
FIG. 12 shows a bottom view of the fan housing for the cooling fan.

FIG. 11 shows a front view of a fan housing 400 for a cooling fan 402 (FIG. 12). Warm air from the computer chassis 1 (FIG. 14) enters the fan housing 400 through the grating 401.

FIG. 12 shows a rear view of the fan housing 400 for the cooling fan 402. Four protrusions 403, 404, 405, 406, protrude from the rear of the fan housing 400. The protrusions 403, 404, 405, 406, engage apertures 407, 408, 409, 410, (FIG. 2) located in the inside rear surface of the computer chassis 1. Each protrusion 403, 404, 405, 406, has a recess 411, 412, 413, 414. As can be seen from FIG. 2, each aperture 407, 408, 409, 410, is approximately the shape of a circle except that a portion of the interior of each aperture 407, 408, 409, 410, is flat. When the fan housing 400 is being mounted to the computer chassis 1 each protrusion 403, 404, 405, 406, engages an aperture 407, 408, 409, 410 by moving in a direction perpendicular to the inside rear surface of the computer chassis 1. Then, once the rear surface of the fan housing 400 is in close proximity to the inside rear surface of the computer chassis 1, by moving the fan housing 400 in a direction parallel to the inside rear surface of the computer chassis 1, the recesses 411, 412, 413, 414, engage the flat portions of the apertures 407, 408, 409, 410. The protrusion 403 and recess 411 engage aperture 407. The protrusion 404 and recess 412 engage aperture 408. The protrusion 405 and recess 413 engage the aperture 409. The protrusion 406 and recess 414 engage the aperture 410.

Figure 13:
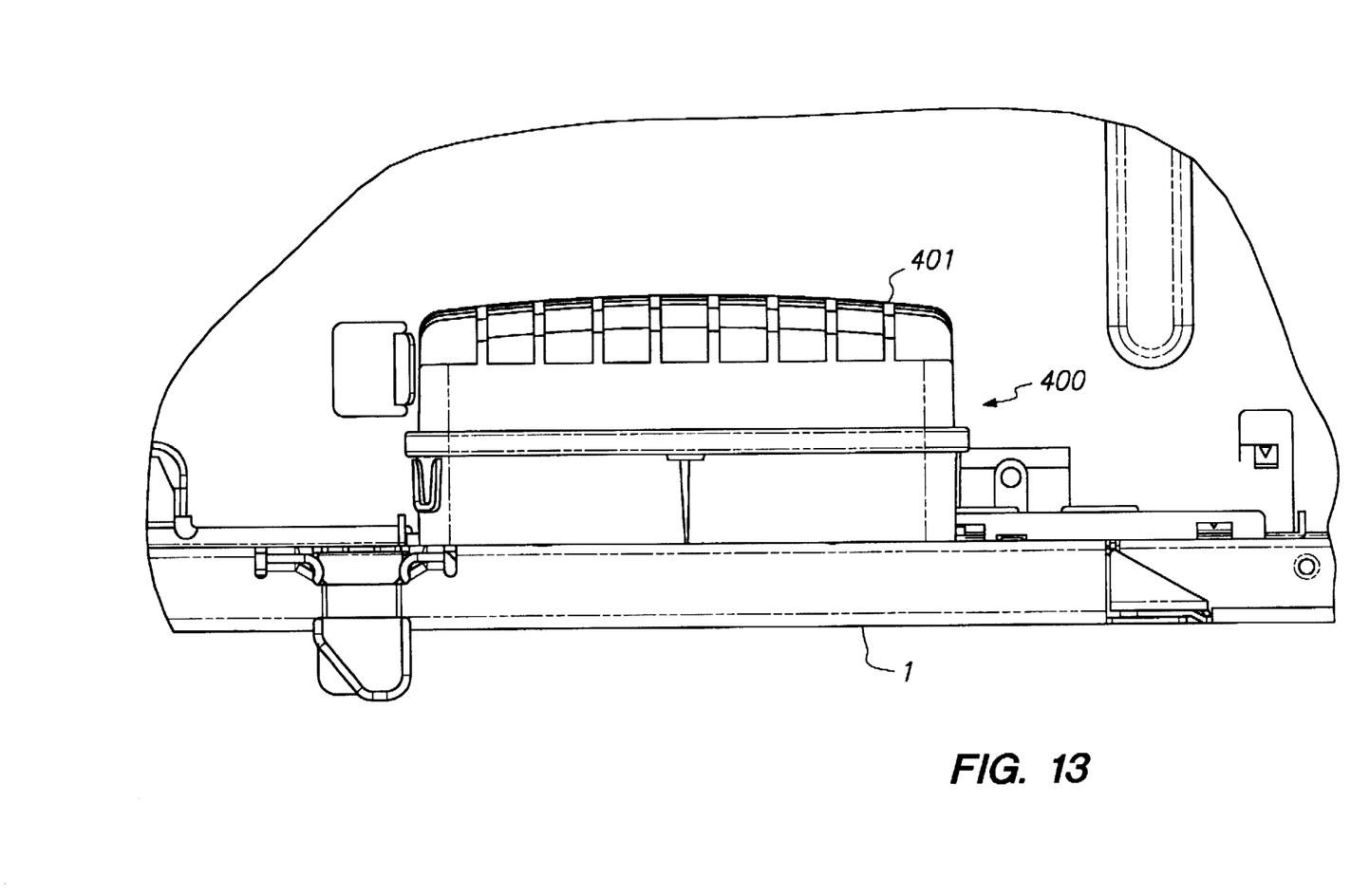
FIG. 13 shows the fan housing attached to the computer chassis.

FIG. 12 also shows two additional protrusions 415, 416, which protrude from the rear of the fan housing 400. The first additional protrusion 415 engages an aperture 417 (FIG. 2) and the second additional protrusion 416 engages an aperture 418 (FIG. 2) in the inside rear surface of the computer chassis 1, only after the fan housing 400 has been moved in the direction parallel to the inside rear surface of the computer chassis wherein the recesses 411, 412, 413, 414, have engaged the flat portions of the apertures 407, 408, 409, 410. In this way, the protrusions 415, 416, snap into place to secure the engagement of the recesses 411, 412, 413, 414, to the flat portions of the apertures 407, 408, 409, 410. Therefore, the fan housing 400 is secured to the computer chassis 1 without the use of screws or the like. Once the fan housing 1 is snapped into place, as shown in FIG. 13, the fan housing may not be easily removed from the computer chassis 1.

Figure 14:
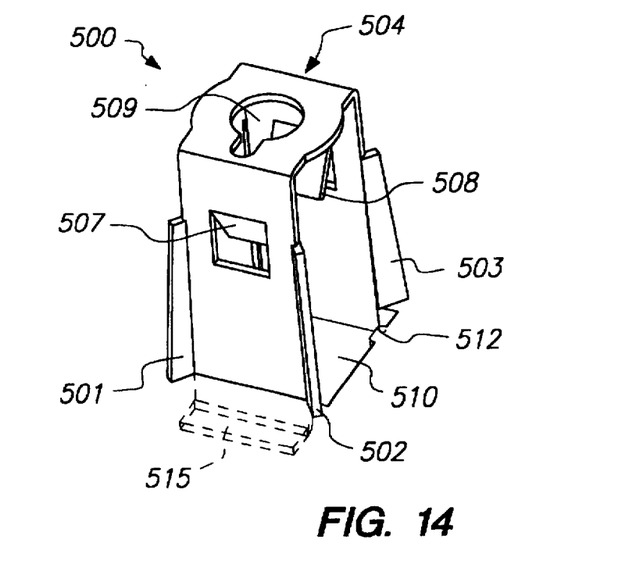
FIG. 14 shows a standoff for mounting a printed circuit board to the computer chassis.

FIG. 14 shows a standoff 500 for mounting a printed circuit board to the computer chassis 1. The standoff 500 is preferably formed of sheet metal with wings 501, 502, 503, 504 (obscured), flaps 507, 508, and a screw receptacle 509. The wings 501, 502, 503, 504, serve to secure the standoff 500 in the opening 510 in the computer chassis 1 and also strengthen the standoff 500. The flaps 507, 508, engage the threads of a screw which is inserted through a printed circuit board and into the screw receptacle 509. Tabs 515 on each side of the standoff 500 prevent the standoff from passing through the opening 510. A bump 512 in the opening 510 of the computer chassis 1 is also shown in FIG. 14 and is shown and described in more detail with reference to FIG. 15.

Figure 15:
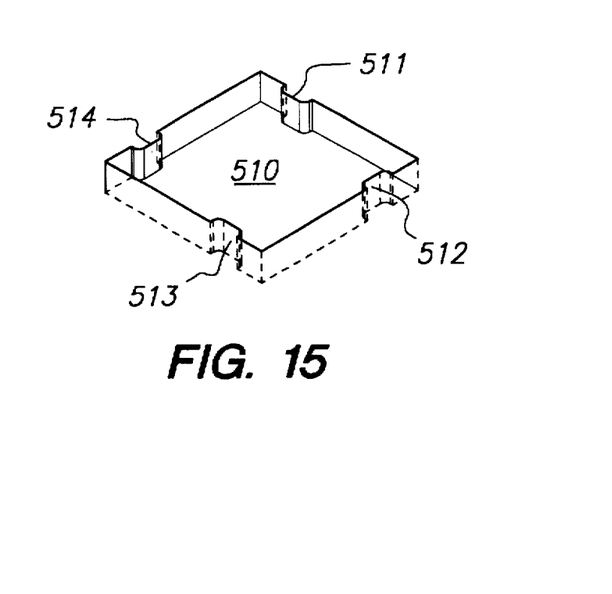
FIG. 15 shows an opening in a surface of the computer chassis for fitting the standoff.

FIG. 15 shows the opening 510 in a surface of the computer chassis 1 which accepts the standoff 500. The inner surface of the opening 510 has bumps 511, 512, 513, 514, which prevent the standoff 500 from rotating in the opening 510 when the standoff is subjected to rotational forces associated with the tightening of a screw in the standoff. It will be apparent that the opening 510 could also, or instead, have bumps positioned to prevent the standoff 500 from rotating in the opening 510 when the standoff 500 is subjected to rotational forces associated with the loosening of a screw in the standoff. It will also be apparent that the positioning of the bumps depends upon whether right or left hand threads are used on the screw.

The standoff 500 is generally located on a bottom inside surface of the computer chassis 1 as shown in FIG. 2. Usually, the standoff 500 is used in conjunction with at least one other standoff to secure a printed circuit board to the computer chassis 1 without allowing any metallic elements on the printed circuit board to make contact with the computer chassis 1.

Figure 16:
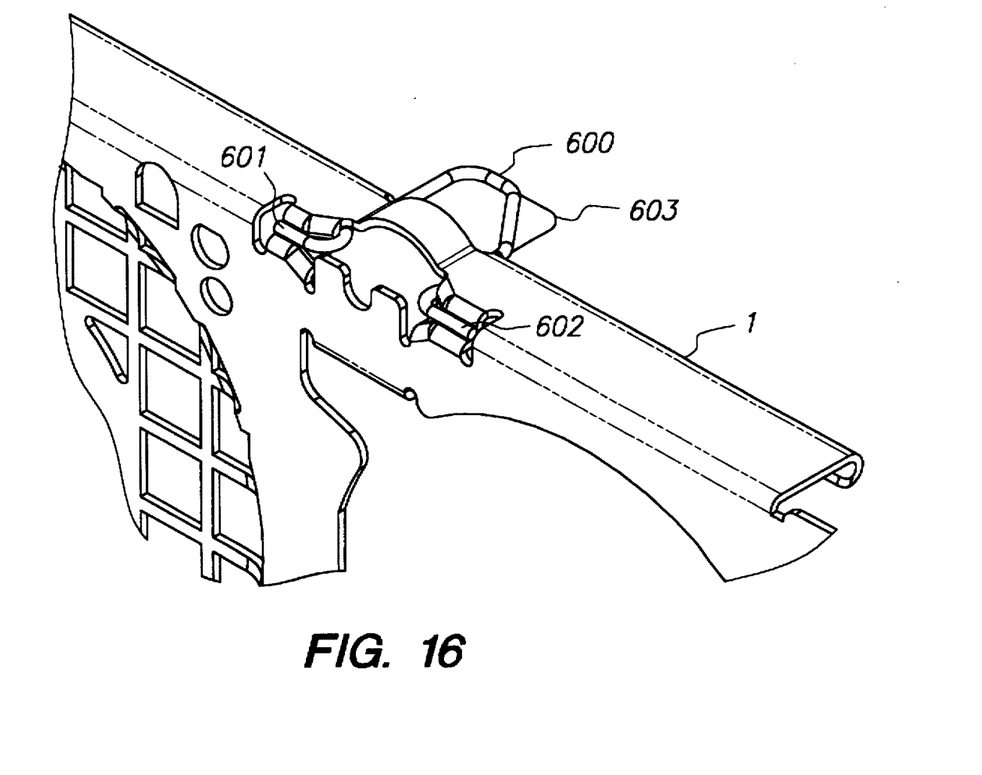
FIG. 16 shows a top view of a security loop attached to the computer chassis in a first position for use.
Figure 18:
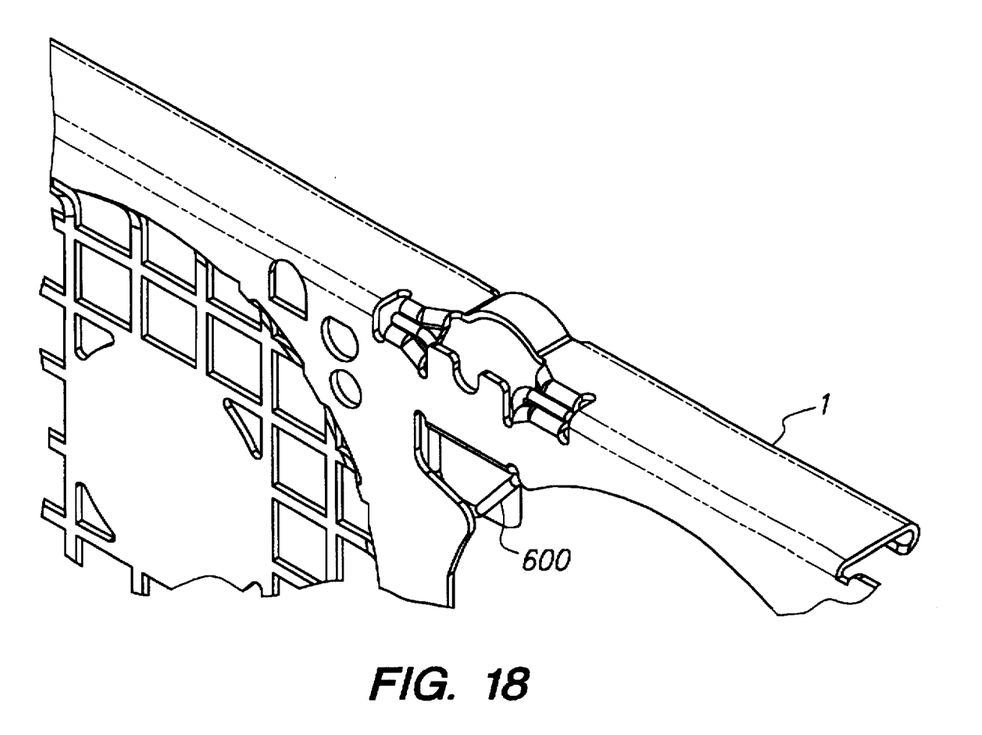
FIG. 18 shows a top view of the security loop attached to the computer chassis in a second position for storage.

FIG. 16 shows a top view of a security loop 600 attached to the computer chassis 1 in a first position. In this position, the security loop 600 is rotated up so that a cable and/or locking device may be inserted through the security loop 600. This allows the computer chassis 1 to be secured to a table, desk or other relatively immovable object to prevent against theft or other unauthorized movement. The security loop 600 rotates relative to the computer chassis 1 about the two ends of the security loop 601, 602. The computer chassis 1 is formed for securing the ends 601, 602 while allowing rotation from the first position to a second position (FIG. 18). The security loop 600 may be of any shape; for example, the security loop could follow the alternate shape shown by the curved line 603. Preferably, when the security loop 600 is in the first position, the security loop 600 protrudes through an aperture in a rear trim plate of the computer case which is attached to the back of the computer. This prevents the removal of the rear trim plate when a cable and/or locking device is attached to the security loop 600.

Figure 17:
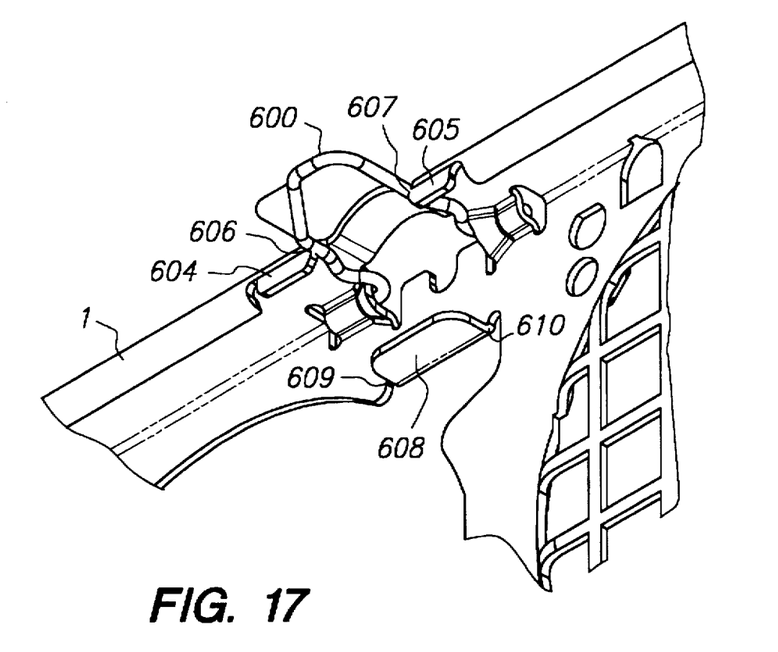
FIG. 17 shows a bottom view of the security loop attached to the computer chassis in the first position for use.

FIG. 17 shows a bottom view of the security loop 600 attached to the computer chassis 1 and positioned in the first position. The computer chassis 1 is formed with tabs 604, 605, which are each formed with an indentation 606, 607 for fastening the security loop 600 in the first position by placing the security loop 600 into the indentations 606, 607, in the tabs 604, 605 as shown in FIG. 17.

FIG. 18 shows a top view of the security loop 600 attached to the computer chassis 1 and positioned in a second position for storage of the security loop 600. The second position is for use when the computer chassis 1 is not secured by a cable or locking device. In this position, the security loop 600 is rotated to be in close proximity with a surface of the computer chassis 1 so that the security loop 600 is unobtrusive. Referring back to FIG. 17, a tab 608 is shown. The tab 608 is formed with two indentations 609, 610, for fastening the security loop 600 in the second position by placing the security loop into the indentations 609, 610 in the tab 608.

The present invention has been described in terms of specific embodiments incorporating details to facilitate the understanding of the principles of construction and operation of the invention. Such reference herein to specific embodiments and details thereof is not intended to limit the scope of the claims appended hereto. It will be apparent to those skilled in the art that modifications may be made in the embodiments chosen for illustration without departing from the spirit and scope of the invention.

What is claimed is:

1. A computer system comprising:
   a. a computer chassis;
   b. a drive unit removably coupled to the computer chassis by entering a front of the computer chassis in either a first orientation relative to the computer chassis or a second orientation relative to the computer chassis wherein the second orientation is rotated 90 degrees relative to the first orientation;
   c. a first trim plate removably attached to the computer chassis when the drive unit is in the first orientation wherein the first trim plate is a side trim plate; and
   d. a second trim plate removably attached to the computer chassis when the drive unit is in the second orientation wherein the second trim plate is a base plate and further wherein a periphery of the second trim plate is larger than a periphery of the first trim plate.

2. The computer according to claim 1 further comprising a housing coupled to the drive unit.

3. The computer according to claim 2 wherein the housing comprises a first group of raised loops corresponding to the first orientation and a second group of raised loops corresponding to the second orientation and wherein the computer chassis comprises a group of clips for engaging one of the first group of raised loops and the second group of raised loops.

4. The computer according to claim 1 wherein the second trim plate is configured for supporting the chassis on a surface.

5. A method of assembling a computer case comprising steps of:
   a. forming a computer chassis wherein the computer chassis is adapted for use in a horizontal model computer case and adapted for use in a tower model computer case;
   b. selecting between the horizontal model and the tower model for the computer case;
   c. attaching a disk drive to the computer chassis in a first orientation when the horizontal model is selected and attaching the disk drive to the computer chassis in a second orientation when the tower model is selected, wherein the first orientation is rotated ninety degrees relative to the second orientation; and d. attaching a first trim plate as a side plate to the computer chassis when the horizontal model is selected and attaching a second trim plate as a base plate to the computer chassis when the tower model is selected wherein a periphery of the second trim plate is larger than a periphery of the first trim plate.

6. The method according to claim 5 further comprising steps of:

a. removing the first trim plate;

b. re-orienting the disk drive housing by ninety degrees; and c. attaching the second trim plate.

7. The method according to claim 5 further comprising steps of:

a. removing the second trim plate;

b. re-orienting the disk drive housing by ninety degrees; and c. attaching the first trim plate.

8. The method according to claim 5 wherein the second trim plate is configured for supporting the chassis on a surface.

9. The method according to claim 5 further comprising a step of attaching feet to a third trim plate of the computer case when the horizontal model is selected.

* * * * *